May 21, 1929.　　　　　C. H. WILD　　　　　1,713,684
CAN FEEDING APPARATUS
Filed March 22, 1922　　　3 Sheets-Sheet 3
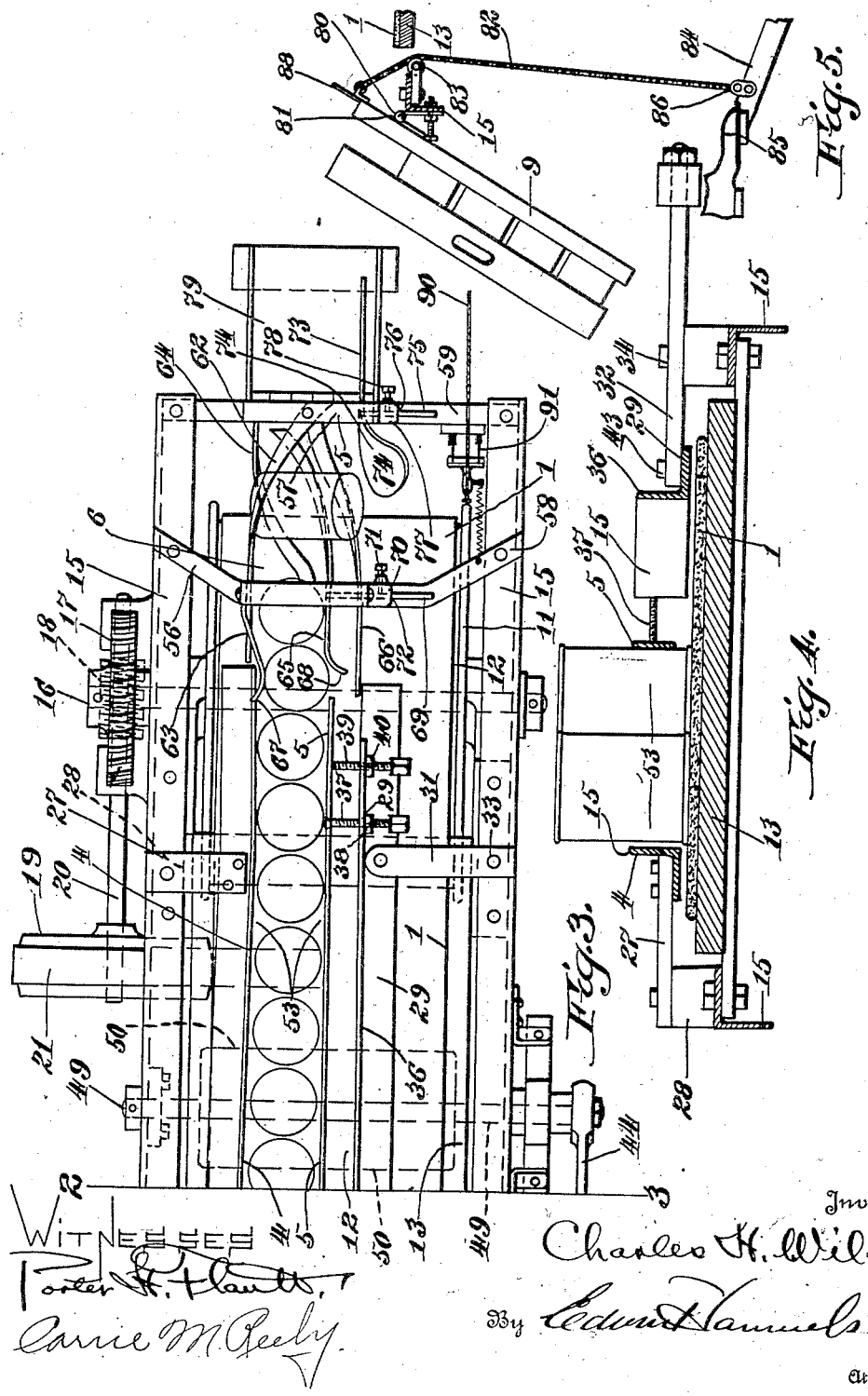

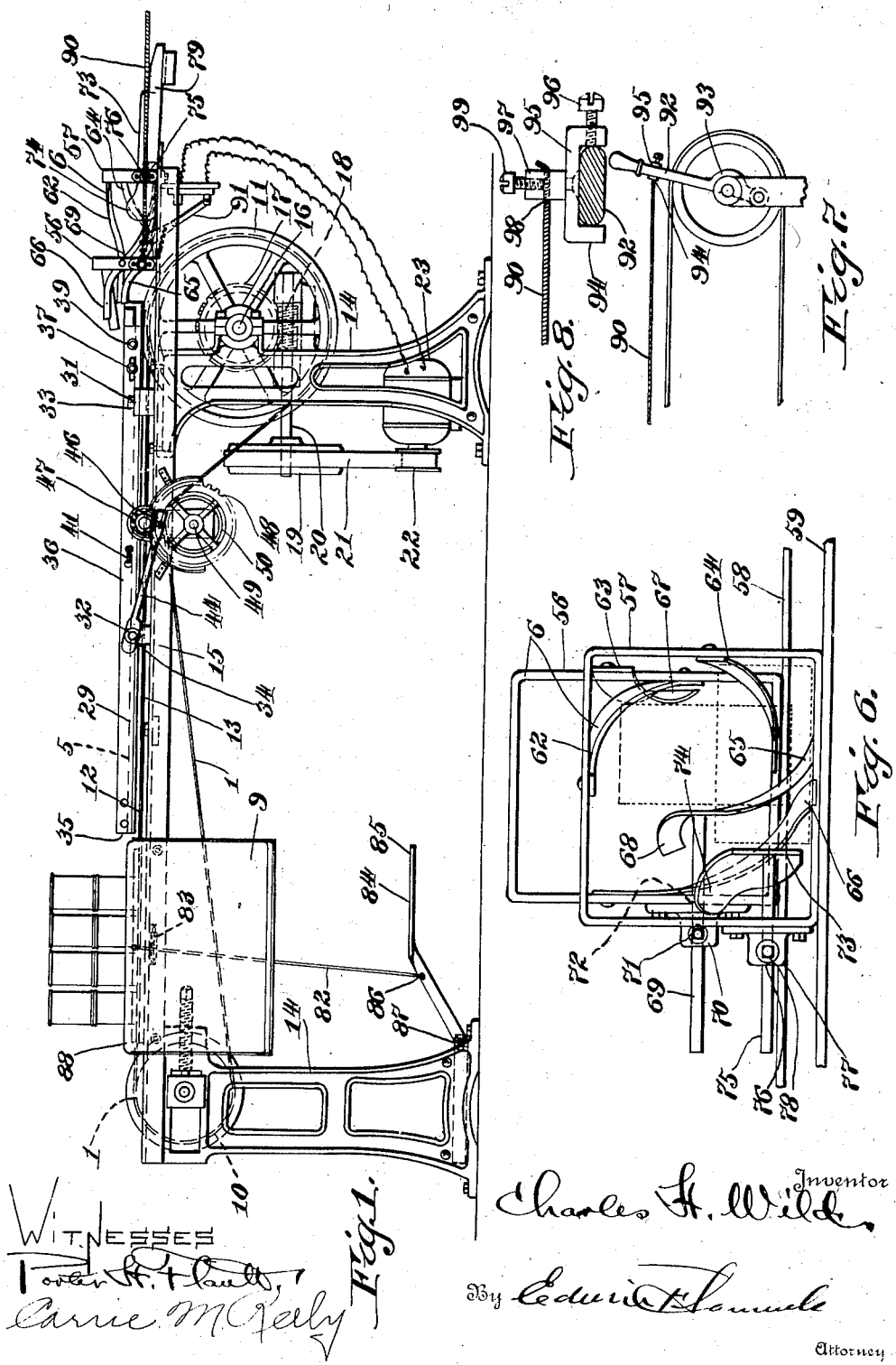

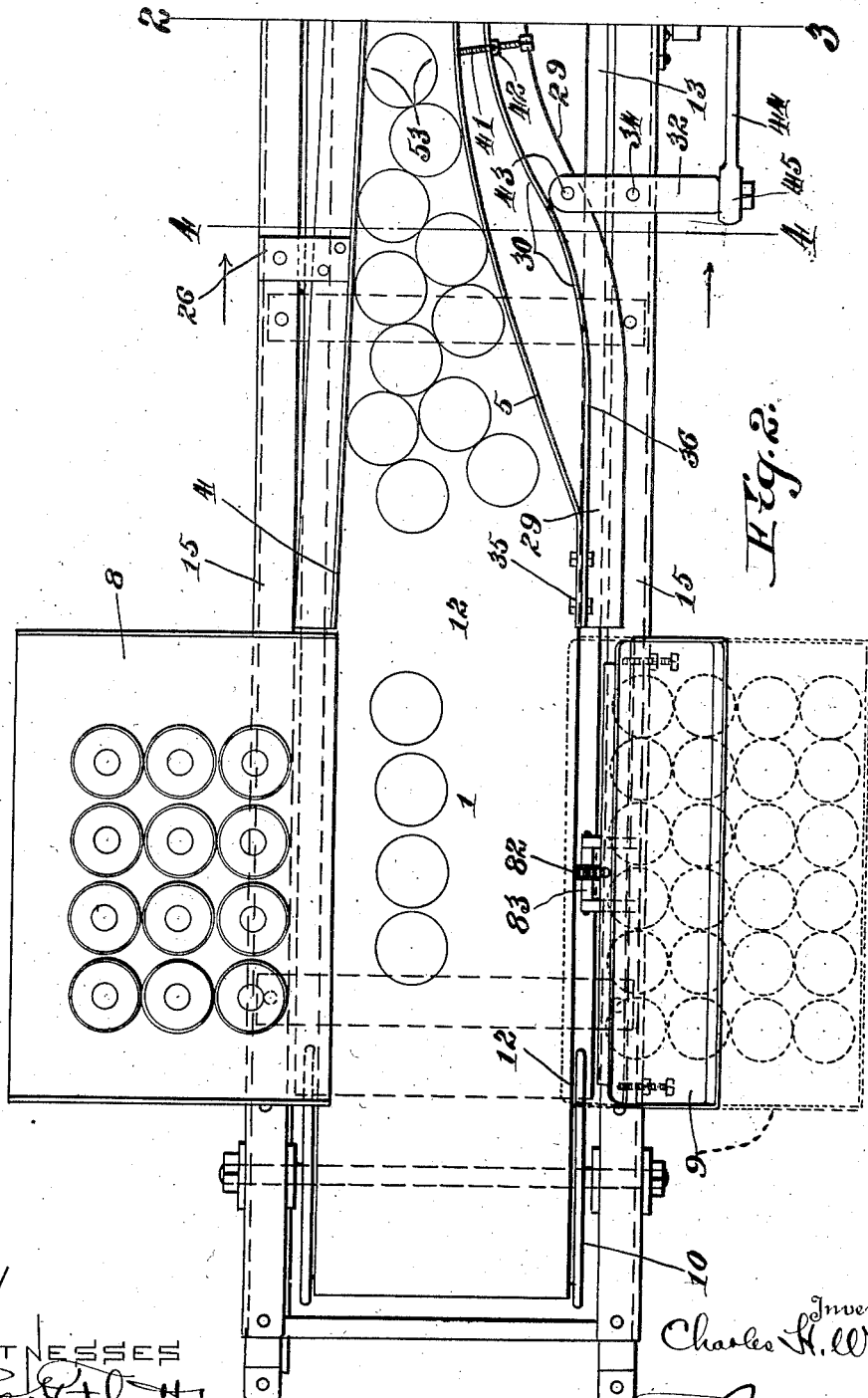

Patented May 21, 1929.

1,713,684

UNITED STATES PATENT OFFICE.

CHARLES H. WILD, OF BALTIMORE, MARYLAND, ASSIGNOR TO BURT MACHINE COMPANY, INCORPORATED, A CORPORATION OF MARYLAND.

CAN-FEEDING APPARATUS.

Application filed March 22, 1922. Serial No. 545,660.

The object of the invention is to economize labor in the feeding of can labelers and other machines which handle cans after they have been filled, though the machine may if desired be used in the feeding of empty cans and various packages. A further object of the invention is to accomplish a feed which is more uniform than can be accomplished by hand. With the hand feed continuity is impossible, there are necessarily long gaps between the cans which result in great loss of efficiency. This difficulty has been eliminated by the automatic feeding device of the invention and a considerable amount of labor formerly required in feeding the machine has been dispensed with, making it possible for one man to feed three or four machines.

The feeding device as illustrated consists of a conveyer belt with side guides substantially in the shape of a funnel leading to a can turner which is immediately adjacent to and delivers to the intake or front end of the machine being fed. This is usually a labeler though it may be any other machine in connection with which such a feed is desirable. In the operation of any funnel feed there is a tendency for the articles being fed to become cramped as they are drawn together by the reducing cross-section of the channel.

An important feature of the present machine in its preferred form consists in the provision of means for oscillating one of the side guides so as to prevent cramping of the cans.

Another feature of the invention is a can turner which is adjustable to receive cans of various different sizes.

In accordance with the preferred form of the invention there are tipping side tables providing for the dumping of the cans from trays placing them all with their ends on the table while the table is nearly vertical and then raising it to horizontal position so that they all stand on end. I have also shown a stationary table which provides for the feeding of a case of cans dumped thereon by turning the case upside down. The top layer being removed by hand and placed on the belt, all of the bottom layer is thrust forward on to the belt at a single operation. The table may, however, be dispensed with the cans being placed on the belt by hand.

In accordance with the invention in the preferred form the switch which controls the electric motor which actuates the feed may be connected mechanically with the clutch lever of the machine being fed so that no power is lost in operating the feeder unnecessarily and there is no piling up of cans on the ways or in the machine being fed, for the switch which controls the feeder is thrown in and out as the clutch lever is correspondingly operated, stopping and starting the feeder simultaneously with the machine with which it is working, which for example may be a labeler.

In the accompanying drawings I have illustrated a feeder embodying my invention in the preferred form. In the drawings:

Figure 1 is a side elevation;

Figures 2 and 3 taken together from a top plan of the machine, the line 2—3 being common to both figures;

Figure 4 is a section on the line 4—4 of Figure 2 looking toward the right;

Figure 5 is an elevation of one of the feed tables;

Figure 6 is an end elevation looking from the right in Figure 1 showing the can turner;

Figure 7 is a fragmentary elevation of the clutch shifting mechanism on the labeler or other machine being fed showing the means for connecting the electric switch of the feeder thereto Figure 7 being, in fact, a continuation of Figure 1 to the right thereof, the bulk of the machine thus fed being omitted, also the middle portion of the cable for connecting the switch of the feeder motor to the clutch mechanism of the machine being fed;

Figure 8 is a section through the clutch lever showing a clamp for connecting a tension member thereto for controlling the switch.

Referring to the drawings by numerals;

The machine as shown comprises the feed or conveyer belt 1, side guides 4, 5 with means for oscillating the latter to prevent cramping of the cans and a can turner 6 at the delivery end of the machine. The machine is preferably provided with means for adjusting the guides and the can turner, and in the preferred form of the machine there is means for connecting the actuating mechanism of the feed with the controlling mechanism of any machine being fed as hereinafter described.

In the form of the invention shown there are feed tables 8, 9, at the sides for transferring the cans to the conveyer belt. The conveyer belt 1 as shown is passed over an idler 10 at one end of the machine and a drive pulley 11 at the other end of the machine and is supported as to the top or feeding portion of the belt 12 by a stationary table 13, the pulleys and other parts of the machine being in turn mounted on and secured to the frame table which has legs 14 connected by horizontal members 15. The pulley 11 is mounted on a transverse shaft 16 driven by worm wheel 17 which is in turn rotated by a worm 18 driven by a pulley 19 on the worm wheel shaft 20, the pulley being driven by belt 21 from the drive pulley 22 of an electric motor 23 mounted on the frame.

At the left side of the machine extending forward from the feed tables substantially parallel to and just above the belt but slightly inclined inward, I have shown the side guide 4 which may be in the form of an angle-iron, see Figures 2, 3 and 4. This angle-iron is supported by metal straps 26 and 27 secured to the frame which are preferably offset in a vertical plane at 28 to raise the side guides above the belt as shown in Figure 4.

The side guide 5 at the right is of somewhat different arrangement, see particularly Figures 2, 3 and 4, the side guide 5 consists of an angle or frame member 29 extending in the direction of the length of the machine and in the direction of the traverse of the belt, but preferably having a curved offset at 30 to provide for the funnel shaped mouth of the guide heretofore referred to. This frame member 29 is carried by arms 31 and 32, pivotally mounted on the frame at 33, 34, or on suitable brackets to swing relatively thereto.

In the preferred form of the invention as illustrated the side guide frame member 29 carries an adjustable side guide proper 5 shown in the form of a flexible member secured at the forward end at 35 to the side guide frame member 29, more particularly the upright flange 36 thereof, for this member is shown in the form of an angle-iron, the flexible side guide member 5 is secured at its rearmost end to the side guide frame member 29 by means of an adjusting screw 37 swivelled in the side guide member and threaded in the frame member 29, being held in adjusted position therein by lock nut 38. Adjustment at this end of the guide is further accomplished by a screw bolt 39 seated in the side guide frame member or the upright flange thereof 36, held by lock nut 40 and bearing at its forward end against the flexible member 5. The position of the flexible frame member is determined by the two screws 37—39, the first of which serves to draw the flexible member toward the frame member and the second of which thrusts it outward, the two screws when tightened serve to give a rigid support in any position of adjustment. The flexible guide member 5 is further adjusted by means of a set screw 41 adjacent the curved offset, the same being threaded through the flange 36 of the side guide frame member 29 and held by a lock nut 42. The screw bears against the flexible guide member 5 serving to determine its position relatively to the frame member and to adjust the width of the opening between the two side guide members at what is herein termed the throat of the funnel formed by the two side guide members 4, 5. The object of the adjustment is to provide for the feeding of different sizes of cans and to adjust the mouth of the funnel.

To prevent cramping of the cans the side guide 5 is oscillated by means of lever 32 which is pivoted at its center, one end being pivotally connected to the side guide frame member 29 at 43 and the other end being engaged by connecting rod 44 preferably having a universal or ball joint connection 45 therewith. The connecting rod 44 is actuated by a crank pin 46, same being carried by a small toothed gear 47 which is in turn driven by a larger toothed gear 48 on a shaft 49 which carries a pulley 50 which is engaged from above by the carrier or conveyer belt 1. In this way the oscillatory or reciprocatory action of the side guide is caused to take place simultaneously with the feeding action of the conveyer belt. The oscillation of the side guide in turn imparts just sufficient of rotary or oscillatory motion to the cans to prevent cramping and causes them to move into the funnel formed by the converging side guides without choking of the passage or funnel which serves to form them into a single line in which they are spaced with substantial uniformity and in which line they move forward through the passage 53 formed by the side guides beyond the funnel or converging portion where the guides are parallel and spaced by adjustment a distance slightly greater than the diameter of the case beyond the side guides 4, 5, and for a portion of its length overlying the delivery end of the belt.

The can turner 6, see particularly Figures 1, 3 and 6, includes two parallel upright rectangular frame members 56 and 57 spaced in the direction of the feed and secured to the frame proper by transverse straps or bars 58, 59, at the bottom, the same being secured to the horizontal side frame members 15 respectively of the machine frame. The can turner further comprises a quarter turn helical guide in which the cans are received in upright position and from which they are delivered with their axes horizontal.

A new and original feature of the can turner resides in its construction whereby it is capable of adjustment making it possible for a single turning mechanism to handle cans of any and all diameters within reasonable limits. The can turner as shown includes a number of helical curved or inclined guide strips 62, 63, 64, 65 and 66, the axis of the helix being of course turned in the direction of the feed. The cans as they approach the turner are received by the forward ends of the intake guide strips 63—65, one at each side of the cans. These strips are bent outward at their forward ends at 67—68 to form a funnel shaped entrance for the cans. The guide strip 63 in the form shown terminates at the frame member 56 giving place to a top guide strip 62 which is inclined from the left to the center of the machine engaging the top of the can and thrusting it over to the right. In fact the entire helix may be properly described as having a right hand pitch, the guide members being substantially parallel to each other, the cans as received being engaged at the opposite top and bottom side edges respectively and having the top turned to the right and the bottom to the left so that the can as it is delivered has its axes horizontally placed as the cans are delivered the guide straps 64 and 74 of the turner engage the end surfaces of the cans and are accordingly spaced.

The important feature of the present device is that it is adjustable to cans of different sizes as to diameter and length. This is accomplished by providing an adjustment of the guide members or guide strips. To this end the right hand helical guide strip 65 in the present instance is provided with a shank 69 which is substantially at right angles to the strip. This is mounted to slide through a suitably apertured boss 70 on the rectangular frame member 56, the shank being held in any desired position of adjustment by means of a set screw 71 threaded into the boss and extending therethrough to the foresaid aperture or slide bearing 72 therein.

For the same purpose, i. e., to provide for the handling of cans of different widths, the guide 73 at the delivery end of the turner, which guide has a curved end 74 which forms part of the helix at the delivery end of the turner is also made adjustable at right angles to the axis of the helix and it is provided with a shank 75 which in a general way is at right angles to the strip or plate 73, said shank being mounted to slide in a suitable bearing 76 in a boss 77 on the frame 57, the shank which slides at right angles to the axis of the helix being held in any desired position of adjustment by a set screw 78. Beyond the turner is a suitably inclined delivery shoot 79. The plate 73 extends well beyond the turner and along the shoot to guide the ends of the cans as they are delivered, the adjustment of the plate 73 as foresaid conforming to the length of the cans while the adjustment of the strap or plate 65 conforms to their diameter.

In supplying cans to the feed mechanism they may be placed by hand at any convenient point on the belt adjacent the mouth of the funnel opening between the guides 4 and 5 and in any suitable groups, an important function of the machine being that it distributes the cans thus supplied to the belt arranging them in a line in which they are spaced in substantial uniformity so that they are fed to the machine to which the feed is attached at regular intervals uniformly spaced to meet the requirements of the machine.

To facilitate feeding from cases or trays I have provided feed tables 8 and 9, either or both of which may be omitted. The table 8 is stationary or rigid and preferably has its top surface slightly above the belt and extending over the belt so that the cans slide freely from the table on to the belt.

The feed table 9 is hinged to swing downward from the normal feeding position which it occupies in a horizontal plane, extending slightly over the belt into a position in which it is almost vertical as shown in Figure 5. More particularly the table 9 is hinged at 80 to the frame members 15 at the side of the conveyer belt 1 which is shown fragmentarily in Figure 5 to swing downward at the side of the belt. The feed table 9 as shown extends beyond the hinge either upward or inward forming a lever arm 81 to the end of which an actuating cord or chain 82 is secured, the same extending downward over an anti-friction roller or pulley 83 on the frame into engagement with a foot lever 84 to which it is secured as shown, the lever having a pedal surface 85 at one end adjacent the point 86 at which the chain is secured and being pivoted at the other end at 87 to some stationary point, preferably on the machine though this is not essential. The table as shown is provided with a lip or extension 88 which when the table is in horizontal position extends over the conveyer belt 1 as foresaid.

In operation the hinged or tipping table 9 provides for the dumping of a tray of cans by placing the tray of cans on the table, the top of the cans resting against the table, when it is in nearly vertical position, when by raising the table to horizontal position the cans being in stable equilibrium, the tray is removed, i. e., lifted off and the cans released, or the tray may be used to push them from the table on to the conveyer belt as a unit. When the tray of cans has been placed on the table 9, as the latter is tipped down, the tray and table being in substantially vertical position, the operator presses his foot on the pedal 85 applying tension to the chain or cord 82 which raises the table to horizontal position.

The stationary table 8 may be used to advantage in feeding cans from cases in which they are usually two or more layers. The case is dumped on the table, the cans being merely inverted but maintaining their arrangement, the top layer or layers if there are two, is ordinarily removed and placed by hand on the belt. When these have been carried forward the entire bottom layer is pushed forward at once, either by means of the empty cases or by hand.

As the cans move forward in the direction of the side guides which as foresaid converge to form a funnel, the groups of cans, it being understood that all of the cans stand on their ends or corresponding flat surfaces, i. e., in upright position, are drawn together transversely and the groups are elongated by the action of the side guides which have a funnel action. At this point there is a tendency for the cans to become cramped and wedged together, checking the action of the feeder and injuring the cans but this tendency is overcome entirely by the action of the oscillatory side guide 5 which imparts to the cans an oscillating motion which causes them to roll slightly on their cylindrical surfaces which contact each other, eliminating the tendency to cramp and causing the group of cans to become gradually elongated to a single file or line which is provided for by the converging of the guides to the point where they are spaced to a distance only slightly greater than the diameter of the cans. As thus arranged the cans move forward, being under ordinary circumstances slightly out of contact and spaced with substantial uniformity. The flexibility of the side guide 5 aids in the production of the desired result, i. e., avoiding cramping of the cans and also prevents scarring and jamming of the cans and further provides an adjustment of the guide as to the funnel shape as foresaid and to the desired width of the runway between the guides beyond the funnel as indicated by reference character 53.

Beyond the side guides is the can turner 6 having flexible forward or receiving ends 63 to lead the cans into the turner and having two of the helical members 65 and 73 adjustable transversely. Adjustment of the member 65 provides for the handling of cans of different diameters as this determines the lateral space provided for the entrance of the cans in upright position and adjustment of the member 73 provides for the turning of cans of different lengths as this member engages the ends of the cans when they are in horizontal position.

The machine is to the best advantage operated by an electric motor which makes it convenient to combine the control of the feed with the control, i. e., starting and stopping mechanism of the machine being fed. In the present instance I have disclosed such a control in the form of a connection shown, a cord or cable 90 connecting the electric switch 91 which controls the motor which actuates the feeder with the hand lever 92 which operates the clutch 93 which controls a separate machine as the labeler or other machine being fed by the feeding apparatus above described. This cable may be conveniently connected both to the switch and to the clutch lever by means of a clamp 94 consisting of a U shaped member 95 enclosing the clutch lever and held by a set screw 96 set in one of the arms of the U, a block 97 being secured to the U shaped member and having an aperture 98 into which the end of the cable is thrust, the cable being held by a set screw 99 seated in the block.

Having thus described specifically and in detail a machine embodying the various features of my invention in the preferred form, I would have it understood that the specific terms herein are used descriptively rather than in a limiting sense, the scope of the invention being defined in the claims.

What I claim and desire to secure by Letters Patent is:

1. A can feeding machine consisting of a conveyer belt, means for driving the same, converging side guides above and in cooperative relation with the belt and means for oscillating one of said guides.

2. In a can feeding device, a conveyer belt, side guides for the cans in cooperative relation with the belt, one of said guides comprising a substantially rigid frame member and a flexible member secured thereto and means for oscillating said frame member and flexible member.

3. In a can feeding machine, a conveyer belt, means for actuating the same and a pair of opposite side guides in cooperative relation thereto, one of said guides comprising a rigid frame member and a flexible guiding member and adjustable means for supporting said flexible member on said rigid member.

4. In a can feeding machine, a conveyer belt, means for actuating the same and a pair of opposite side guides in cooperative relation thereto, one of said guides comprising a rigid frame member and a flexible guiding member proper and adjustable means for supporting said flexible member on said rigid member for varying the contour of the flexible member.

5. In a can feeding machine, a conveyer belt, means for actuating the same and a pair of opposite side guides in cooperative relation thereto, one of said guides comprising a rigid frame member and a flexible guiding member proper and adjustable means for supporting said flexible member on said rigid member for varying the contour and position of the flexible member.

6. In a machine for feeding cans, a conveyer belt, a rigid support for the belt, converging side guides in cooperative relation with the belt and a can turner in alignment with the belt and in cooperative relation with the side guides, means for adjusting one of said guides and means for adjusting the can turner to provide for cans of different widths.

7. In a machine for feeding cans, a conveyer belt, a rigid support for the belt, side guides in cooperative relation with the belt and a can turner in alignment with the belt and in cooperative relation with the side guides, means for oscillating one of said side guides and means for adjusting the can turner to provide for cans of different widths.

8. In a machine for feeding cans, a conveyer belt, a rigid support for the belt, side guides in cooperative relation with the belt and a can turner in alignment with the belt and in cooperative relation with the side guides, means for oscillating one of said side guides and means for adjusting the can turner to provide for cans of different widths, and means for adjusting one of said guides.

9. In a machine for feeding cans, a conveyer, side guides in cooperative relation with the conveyer, one of said side guides comprising a rigid frame and a flexible member secured to one end of said frame, adjustable means for spacing said flexible member from the frame near the side of said flexible member and adjustable means for securing said flexible member to the frame adjacent the opposite end of said flexible member.

10. In a machine for feeding cans, a conveyer, side guides in cooperative relation with the conveyer, swinging levers pivotally mounted on the frame supporting one of said side guides, a connecting rod connected to said side guides, and means for imparting reciprocating motion to said rod, and hence to the lever, and an arcuate motion to the side guide.

11. In a machine for feeding cans, a conveyer, side guides in cooperative relation with the conveyer, swinging levers pivotally mounted on the frame supporting one of said side guides and a connecting rod connected to said side guides and means for actuating the connecting rod producing the said swinging motion of the levers and imparting an arcuate motion to the guide.

12. In a can feeding machine, a conveyer, side guides cooperating with the conveyer, one of said guides having a frame member consisting of an angle-iron having a curved offset and a flexible band adjustably mounted on said frame.

13. In a can feeding machine, a conveyer, side guides cooperating with the conveyer, one of said guides consisting of an angle-iron having a curved offset, a flexible band and means adjustably supporting said band on said angle-iron, said adjustable means consisting of set screws spaced in the direction of the length of said guide, the same being seated in the frame.

14. A can turner consisting of helically arranged guides, means for feeding the cans to and through said turner, one of said guides having a shank substantially at right angles to the guide on which shank it is supported, and means for securing the shank in a plurality of positions of adjustment varying in the direction of the length of the shank.

15. A can turner consisting of helically arranged guides, means for feeding the cans to and through said turner, some of said guides engaging the sides of the cans and other guides engaging the ends of the cans, part of the guides engaging the sides of the cans and part of the guides engaging the ends of the cans having shanks substantially at right angles to their length, and means for securing the shanks in a plurality of positions of adjustment in the direction of their length.

16. In a can feeding machine, a conveyer belt, side guides, a feed table hinged to swing to vertical position from the plane of the conveyer and foot actuated means for swinging the table substantially into the plane of the conveyer belt.

Signed by me at Baltimore, Maryland, this 14th day of March, 1922.

CHARLES H. WILD.